US006966470B1

(12) United States Patent
Charlton

(10) Patent No.: US 6,966,470 B1
(45) Date of Patent: Nov. 22, 2005

(54) CARRYING BAG ASSEMBLY

(76) Inventor: Marjorie Deas Charlton, 966 Concord Way, Neshanic Station, NJ (US) 08853

( * ) Notice: Subject to any disclaimer, the term of this patent is extended or adjusted under 35 U.S.C. 154(b) by 76 days.

(21) Appl. No.: 10/385,866

(22) Filed: Mar. 11, 2003

(51) Int. Cl.[7] ........................ B60R 11/00; B65D 33/14
(52) U.S. Cl. ...................... 224/407; 224/572; 190/117; 383/22; 135/66
(58) Field of Search ............................... 224/407, 264, 224/901.2, 901.4, 409, 411, 420, 421, 572, 224/578–580, 584–585; 190/117; 383/13, 383/15, 22; 294/146, 164; 135/66–68

(56) References Cited

U.S. PATENT DOCUMENTS

| | | | | |
|---|---|---|---|---|
| 2,274,605 | A * | 2/1942 | Hoffmeister | 16/411 |
| 3,957,071 | A | 5/1976 | Kenner | |
| 4,262,385 | A * | 4/1981 | Norman | 16/411 |
| 4,339,061 | A | 7/1982 | Dunn | |
| 4,491,257 | A | 1/1985 | Ingles | |
| 4,800,911 | A | 1/1989 | Endres et al. | |
| 4,830,238 | A | 5/1989 | Widinski et al. | |
| 4,974,760 | A | 12/1990 | Miller | |
| 5,012,963 | A | 5/1991 | Rosenbaum | |
| D324,504 | S | 3/1992 | Olsen | |
| 5,214,874 | A * | 6/1993 | Faulkner | 43/25.2 |
| 5,340,005 | A | 8/1994 | Woods et al. | |
| D352,260 | S | 11/1994 | Adamo | |
| 5,431,317 | A * | 7/1995 | Kliot | 224/153 |
| 5,476,432 | A | 12/1995 | Dickens | |
| 5,487,582 | A * | 1/1996 | Bourgeois et al. | 294/146 |
| 5,566,871 | A * | 10/1996 | Weintraub | 224/264 |
| 5,603,591 | A * | 2/1997 | McLellan | 410/97 |
| 5,738,398 | A * | 4/1998 | Miano | 294/1.1 |
| D409,953 | S | 5/1999 | Heineken et al. | |
| 5,901,891 | A | 5/1999 | Douglass | |
| 5,964,386 | A | 10/1999 | Cote | |
| D448,663 | S * | 10/2001 | Raftree | D9/434 |
| 6,302,126 | B1 | 10/2001 | Nava | |
| 6,378,925 | B1 * | 4/2002 | Greenlee | 294/171 |
| 6,513,691 | B1 * | 2/2003 | Edgerly | 224/537 |

* cited by examiner

*Primary Examiner*—Nathan J. Newhouse
(74) *Attorney, Agent, or Firm*—Sperry, Zoda & Kane

(57) ABSTRACT

The carrying bag assembly of the present invention is designed to be detachably securable with respect to the structural bar of a disability aiding device such as a walker which includes a carrying bag with an enclosure for holding items therein and a bag handle. The bag handle preferably includes first and second handle straps. A handle retaining means is securable to the handle and can secure the two straps of the handle together by an inner attachment device which extends around the bag handle for securement thereto. Preferably the inner attachment device includes hook and loop fasteners. An outer attachment mechanism is also included positioned extending around the inner attachment means and secured thereto and being capable of defining a bar retaining channel therein for detachable securement with respect to the structural bar member preferably by Velcro means. An optional lower attachment mechanism can be included for securement of the bag to the walker at a lower position thereadjacent.

17 Claims, 2 Drawing Sheets

CARRYING BAG ASSEMBLY

BACKGROUND OF THE INVENTION

1. Field of the Invention

The present invention deals with the field of auxiliary holding means attachable with respect to medical walking aids such as walkers or wheelchairs. The carrying bag of the present invention is designed to be detachably secured with respect to a structural bar member thereof with a unique securement mechanism which allows use of the carrying bag or purse in position attached to the walker or other similar piece of equipment as well as being fully usable separately therefrom as a standard purse or carrying bag or tote bag.

The handle retaining device of the present invention can secure the two straps of the handle together by an inner attachment device which extends around the bag handle for securement thereto in the size and texture to provide for both a secure attachment to the walker bar and, alternatively, a detailed as well as comfortable and easy means of holding accessories. It is a distinct improvement over the prior art since it is economical and can be used to carry items while attached to the walker, or detached should the walker be folded, not in use or no longer needed. In this manner the apparatus of the present invention provides a unique dual function over the prior art. It also assists individuals who have limited dexterity in their fingers and hands by the ease with which it can be attached and/or detached as necessary. Furthermore it improves the mobility and safety of the walker and in this manner enhances significantly the quality of life for the user.

2. Description of the Prior Art

Numerous devices have been patented for facilitating the carrying of articles in association with medical walking aid equipment such as walkers and wheelchairs and other similar such as shown in U.S. Pat. No. 3,957,071 patented May 18, 1976 to M. B. Kenner on a “Carrier Attachment For Invalid Walkers”; and U.S. Pat. No. 4,339,061 patented Jul. 13, 1982 to P. Dunn and assigned to Philbag Co., Inc. on an “Accessory Case For A Wheel Chair”; and U.S. Pat. No. 4,491,257 patented Jan. 1, 1985 to W. L. Ingles on an “Attachable Basket For Invalid Support Equipment”; and U.S. Pat. No. 4,800,911 patented Jan. 31, 1989 to K. O. Endres et al on a “Walker Carrier”; and U.S. Pat. No. 4,830,238 patented May 16, 1989 to P. R. Widinski et al and assigned to Health & Home Products, Inc.; and U.S. Pat. No. 4,974,760 patented Dec. 4, 1990 to P. H. Miller on an “Article Carrier For A Walker”; and U.S. Pat. No. 5,012,963 patented May 7, 1991 to P. Rosenbaum on a “Walker Support Tote Bag”; and U.S. Pat. No. 5,340,005 patented Aug. 23, 1994 to R. D. Woods et al on a “Fabric Accessories For Crutches And Walkers, Providing Carrying Expandable Volumes For Personal Use Items And Shopping Items, And Presenting Reflective Fabric Portions Thereof For Observation By Others”; and U.S. Pat. No. 5,476,432 patented Dec. 19, 1995 to R. Dickens on a “Medical Stroller”; and U.S. Pat. No. 5,901,891 patented May 11, 1999 to K. J. Douglass on an “Attachable Container Particularly Suited For Ambulatory Aids”; and U.S. Pat. No. 5,964,386 patented Oct. 12, 1999 to L. M. Cote on a “Detachable Accessory Holder”; and U.S. Pat. No. 6,302,126 patented Oct. 16, 2001 to V. Nava on an “Attachment For A Walker”; and U.S. Design Pat. No. Des. 324,504 patented Mar. 10, 1992 to F. L. Olsen on a “Carrier For Use With A Walker”; and U.S. Design Pat. No. Des. 352,260 patented Nov. 8, 1994 to H. J. Adamo on a “Walker Apron With Pockets”; and U.S. Design Pat. No. Des. 409,953 patented May 18, 1999 to J. H. Heineken et al on a “Walker Article Carrier”.

SUMMARY OF THE INVENTION

The present invention provides a unique configuration for a carrying bag assembly which is detachably securable with respect to a disability aiding device such as a walker or wheelchair which includes a structural bar member to which the carrying bag assembly can be detachably secured. The carrying bag assembly also is preferably usable in a second configuration wherein it is usable as a conventional purse or tote bag.

The carrying bag assembly of the present invention includes a carrying bag defining a carrying enclosure therein for retaining of articles and various items. A bag handle is attached with respect to the carrying bag for the purpose of facilitating holding thereof. This bag handle preferably includes a first handle strap and a second handle strap which are both attached with respect to the carrying bag for facilitating holding thereof and facilitating opening of the carrying enclosure defined therewithin.

The assembly further includes a handle retaining means which engages and retains the bag handle therewithin and is adapted to engage and retain a structural bar member of a disability aiding device therewithin for facilitating detachable securement of the carrying bar assembly with respect thereto.

The handle retaining means preferably includes an inner attachment mechanism extending around the bag handle for holding this handle. The inner attachment mechanism is operative to extend around both the first handle strap and the second handle strap for facilitating detachable securement thereof together. The inner attachment mechanism includes an inner wrapping member for wrapping around the first handle strap and the second handle strap to facilitate retaining thereof together. A first inner securement device is positionable adjacent the first handle strap and is engageable therewith. This first inner securement mechanism includes a first inner hook and loop fastening mechanism. This mechanism is attached to the first handle strap and to the inner wrapping member to facilitate detachable securement therebetween.

Similarly a second inner securement mechanism is included positionable adjacent the second handle strap such as to be engageable therewith to facilitate securement together of the first handle strap and the second handle strap by the inner attachment mechanism. The second inner securement device includes preferably a second inner hook and loop fastening device attached to the second handle strap and to the inner wrapping member to facilitate detachable securement therebetween.

The handle retaining means preferably also includes an outer attachment mechanism positioned extending around the inner attachment mechanism and secured thereto and detachably securable extending around the structural bar of the disability aiding device to facilitate detachable mounting of the carrying bag assembly with respect thereto. The inner attachment mechanism is integral with respect to the outer attachment device to facilitate retaining of the bag handle and the structural bar member of the disability aiding device therewithin simultaneously.

In the preferred configuration the outer attachment mechanism includes an outer wrapping member positioned wrapping around the inner wrapping member and capable of wrapping around the structural bar member of the disability aiding device to facilitate retaining of the carrying bag assembly thereon. It is also capable of wrapping around the inner wrapping member solely to facilitate independent use of the carrying bag assembly separate and distinct from the walker or other disability aiding device. The outer wrapping member can preferably be capable of defining a bar retaining channel therein responsive to attachment of the outer attachment means around the structural bar of the disability aiding device for the purpose of facilitating detachable retaining of the carrier bag assembly thereto. The outer attachment mechanism also includes an outer securement means mounted on the outer wrapping member to facilitate selective retaining thereof in position extending around the structural bar member of a walker or the like. The outer securement mechanism includes an outer hook and loop fastening device attached to the outer wrapping member to facilitate detachable retaining of the structural bar member of the disability aiding device therewithin. The outer securement mechanism preferably includes a primary attachment configuration as well as a secondary attachment configuration for allowing usage of the outer wrapping member positioned in two alternate configurations. These alternate configurations allow positioning of the outer securement means of the outer attachment means in a primary attachment configuration which defines the bar retaining channel thereto to facilitate receiving and retaining of the structural bar member of the disability aiding device therewithin to facilitate mounting of the carrying bag assembly with respect thereto. Furthermore positioning of the outer securement means is capable in the secondary attachment configuration which facilitates positioning of the outer wrapping member in abutting engagement directly surrounding the inner wrapping member in such a manner as to allow usage of the carrying bag assembly independently from the walker or other medical ambulatory aiding device.

In the preferred configuration of the handle retaining apparatus of the present invention a user will grasp the outer portion of the second attachment mechanism and exert an inwardly directed force while gripping thereof during holding of the carrying bag assembly during normal use as a purse or tote bag. This inwardly directed radial force will tend to more fixedly secure the first attachment mechanism extending around the bag handle and will also more fixedly secure the second attachment mechanism positioned extending around the first attachment mechanism and aid in affixing of both the first attachment mechanism and the second attachment mechanism. In a further embodiment the apparatus of the present invention can include a lower attachment mechanism for selectively engaging the carrying bag directly to the disability device at a location spatially disposed from and below the structural bar assembly to provide an additional means of securement with respect to the walker or similar device.

It is an object of the present invention to provide a carrying bag assembly which is securable with respect to a disability aiding device.

It is an object of the present invention to provide a carrying bag assembly which is securable with respect to a structural bar of any disability aiding device such as a walker or wheelchair.

It is an object of the present invention to provide a carrying bag assembly which defines an enclosure therewithin for retaining articles.

It is an object of the present invention to provide a carrying bag assembly which has extremely low maintenance requirements.

It is an object of the present invention to provide a carrying bag assembly which has a small initial capital cost.

It is an object of the present invention to provide a carrying bag assembly which provides a unique handle retaining means including an attachment means for holding the bag handle and another attachment means selectively engageable with respect to the structural bar of a disability aiding device for securing the carrying bag with respect to it.

It is an object of the present invention to provide a carrying bag assembly which can be used in position attached to a walker or other medical ambulatory aid device as well as separate use as an independent tote bag or purse.

It is an object of the present invention to provide a carrying bag assembly which allows for easy and quick detachable securement by the use of hook and loop fasteners at multiple locations.

It is an object of the present invention to provide a carrying bag assembly which can be easily manipulated by those having limited manual dexterity especially such individuals with arthritis.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
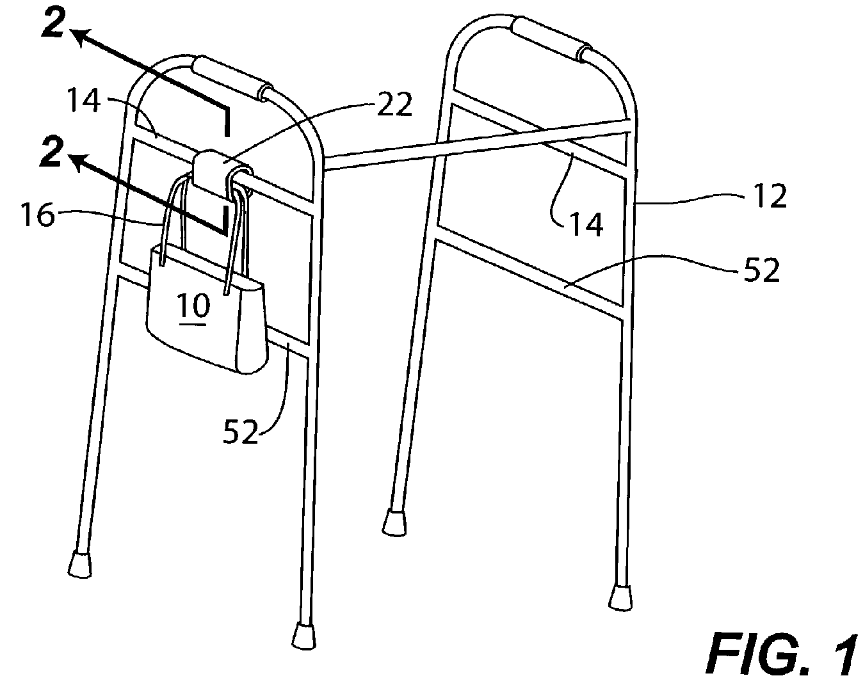
FIG. 1 is a front perspective illustration of the carrying bag assembly shown in position secured with respect to a walker including a structural bar member.

The present invention provides a carrying bag assembly which is securable with respect to a walker 12 or other similar disability aiding device which preferably includes a horizontally extending bar member 14.

The carrying bag assembly includes a carrying bag 10 defining an enclosure 11 therewithin for holding and retaining articles such as will be utilized for a conventional purse or tote bag.

For most women or others using tote bags who are somewhat disabled and need to use a walker or other disability aiding device 12 both hands are required to be placed upon the device 12. As such, there is no free hand available for holding of a purse or carrying bag 10. The present invention provides a unique mechanism for detachably securing the carrying bag 10 with respect to a structural bar member 14 of a walker 12 wherein the carrying bag 10 can be utilized in a primary configuration 46 attached with respect to the structural bar member 14 of the walker 12 or can also be used in a secondary configuration 48 independently from attachment to the walker 12 such that the carrying bag 10 functions as a standard purse or tote or carrying bag in those circumstances where a walking aid 12 is not required.

Maintaining the ambulatory nature of older persons is an important characteristic and for women it is required that a separate purse or walking means be maintained on their person even while using a walker or wheelchair. The present invention provides a purse or carrying bag 10 or tote bag which can be utilized attached to the walker 12 or used separate and independently therefrom thereby providing a maximum degree of utilitarian freedom to the owner.

Figure 2:
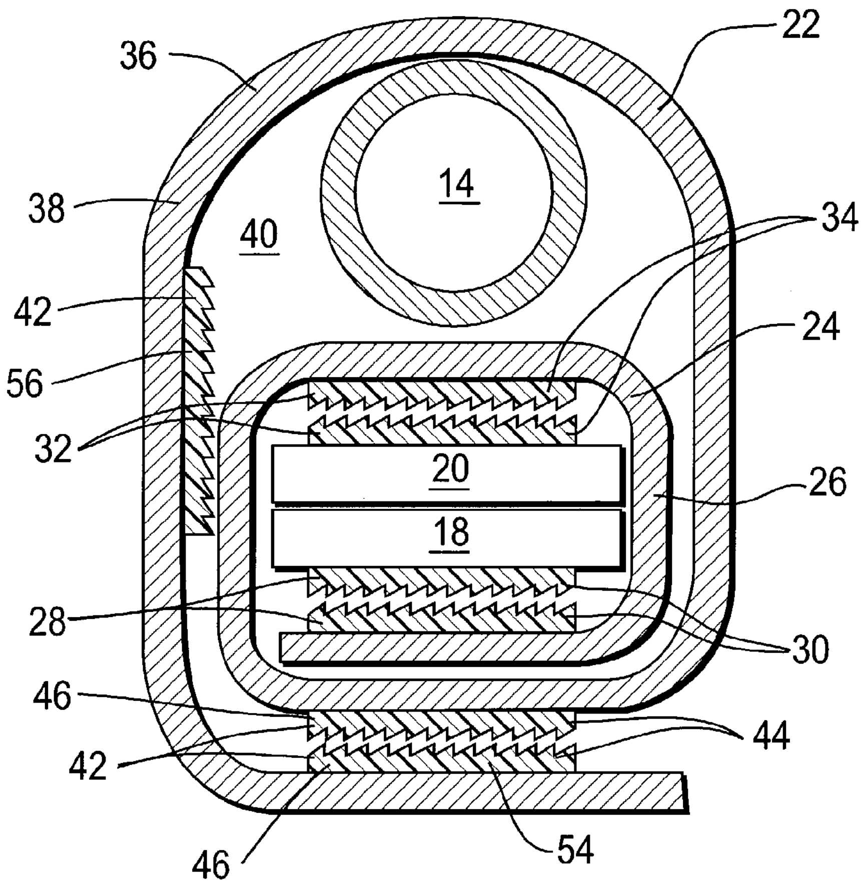
FIG. 2 is a cross-sectional illustration of FIG. 1 along lines 2—2 showing the handle retaining means in the primary configuration.
Figure 3:
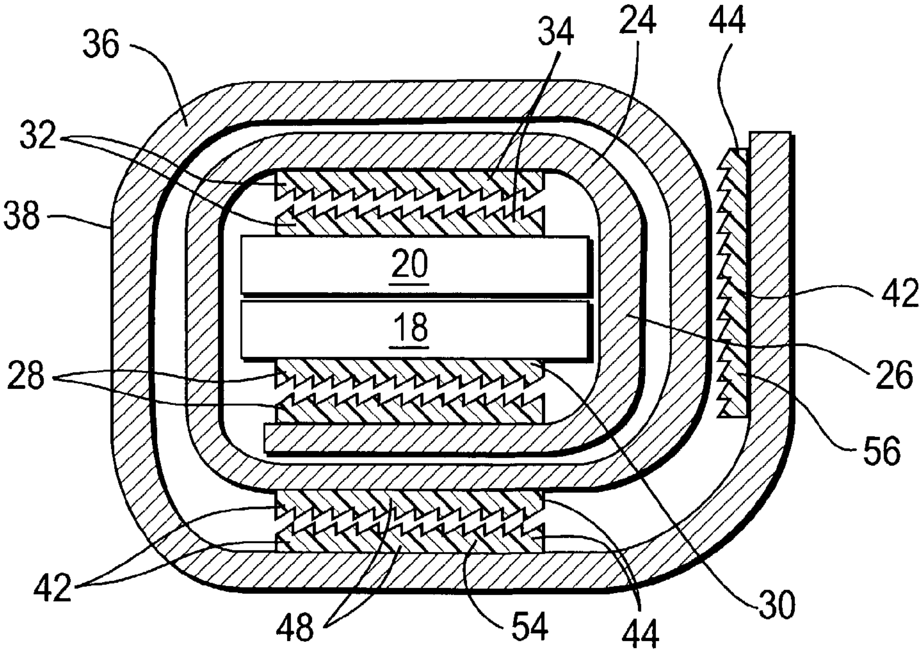
FIG. 3 is a cross-sectional illustration of the present invention showing the handle retaining means in the secondary configuration detached from the structural bar for facilitating conventional use thereof as a purse or tote bag.

The carrying bag assembly preferably includes a bag handle 16 which can be a single handle member or can include two separate handle straps. With the two separate handle straps as shown in FIGS. 2 and 3, the first handle strap 18 will be defined and the second handle strap 20 will be defined. These two handle straps 18 and 20 can be detachably secured together by a handle retaining means 22. An inner attachment means 24 is preferably positioned extending around the bag handle and in this case both the first handle strap 18 and the second handle strap 20 for the purpose of securing them together and securing them with respect to the handle retaining means 22. Furthermore the handle retaining means 22 includes an outer attachment mechanism 36 which is defined extending around the inner attachment mechanism 24 and is secured thereto for detachable securement of the first and second handle straps 18 and 20 with respect to the structural bar member 14 of a walker or wheelchair 12.

In the preferred configuration the inner attaching means includes an inner wrapping member in the form of a panel of material which includes a first inner securement means 28 for securing of the inner wrapping member 26 with respect to the first handle strap 18. A second inner securement means 32 may be detachably securable with respect to the second handle strap 20 of bag handle 16 such that it is securable with respect to the handle retaining means 22. In this manner handle retaining means 22 and the inner attachment mechanism 24 thereof can include an inner wrapping member 26 extending around the first and second handle straps 18 and 20 and attached thereto by a first inner securement mechanism 28 and a second inner securement mechanism 32.

In a preferred configuration the first inner securement mechanism 28 will be defined as a first inner hook and loop fastener means 30 commonly known as a Velcro (trademark) mechanism. In a similar manner the second inner securement mechanism 32 can be configured as a second inner hook and loop fastener mechanism 34.

An outer wrapping member 38 will preferably be integrally formed with respect to the inner wrapping member 26 and will extend therearound in the primary configuration 46 shown in FIG. 2. The outer wrapping member 38 will define a bar retaining channel 40 for securement with respect to the structural bar member 14 of the wheelchair or walker or other similar device. An outer securement means 42 will be included in the outer attachment mechanism 36 for securing of the handle retaining mechanism 22 with respect to the structural bar member 14. In the preferred configuration the outer securement device 42 will comprise an outer hook and loop fastening means 44.

In the secondary configuration 48 shown best in FIG. 3 the outer attachment mechanism 36 can include the outer wrapping member 38 thereof wrapped tightly around the outer surface of the inner wrapping member 26 to facilitate engagement of the outer securement means 42 in this secondary configuration 48 which is more useful in making use of the carrying bag 10 as a purse or tote bag independently of the walker or wheelchair device.

As shown best in FIGS. 2 and 3, in the preferred configuration, the outer hook and loop fastening means 44 will have two separate mating mechanisms on the inner surface thereof. As shown in FIG. 1 the primary affixing panel 54 will be securable when the outer attachment mechanism 36 defines the bar retaining channel 40 therethrough. In the configuration shown in FIG. 3 which is the secondary configuration 48 the secondary affixing panel 56 will attach with respect to the same hook and loop attachment panel but in the secondary configuration 48 for the purpose of collapsing the outer wrapping member 38 about the inner wrapping member 26 for usage in this secondary configuration 48.

In other words it is important to consider that the outer attachment means 36 of the present invention can be utilized in two separate configurations, namely, the primary configuration 46 shown in FIG. 2 and the secondary configuration 48 shown in FIG. 3. In the primary configuration 48 the outer hook and loop fastening means 44 will make use of the primary affixing panel 54. On the other hand, in the secondary configuration 48 of the outer attachment means 36 as shown in FIG. 3, the secondary affixing panel 56 will be used for securement of the outer wrapping member 38 in the more collapsed position since it is no longer needed to define a bar retaining channel 40 since the secondary configuration 48 is designed for usage independently and separately distinct from attachment to a walker as would be a conventional purse design.

Figure 4:
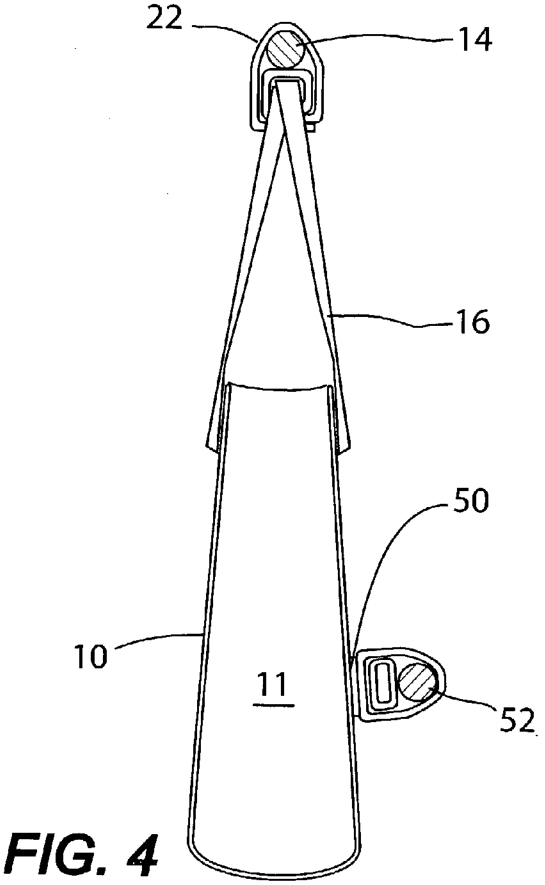
FIG. 4 is a side plan view of an embodiment of the carrying bag of the present invention shown attached with respect to a structural bar member.

To facilitate attachment of the carrying bag 10 of the present invention with respect to the walker or other similar device 12 a supplementary attachment mechanism may be included shown as the lower attachment means 50 in FIGS. 1 and 4. This lower attachment mans 50 will include preferably a Velcro hook and loop fastener between the outer portion of the carrying bag 10 and a lower structural bar member 52 on the walker 12 positioned spatially distant below the structural bar to which the handle retaining means 22 is secured.

It is important to appreciate that the present invention provides a unique configuration for a carrying bag assembly with a uniquely configured handle retaining apparatus including an inner attachment means 24 for securing of the bag handle 16 and a uniquely configured outer attachment mechanism 36 for securing of the handle retaining means 22 with respect to the structural bar 14 of a walker, wheelchair or other similar disability device 12.

Figure 5:
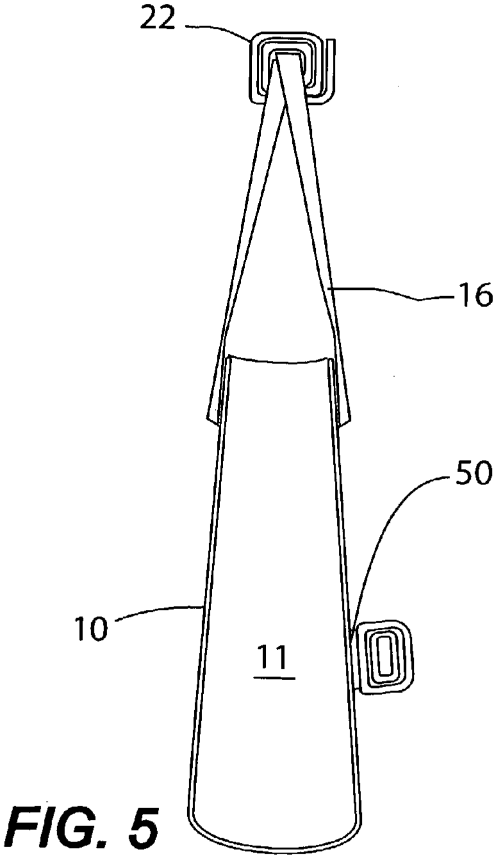
FIG. 5 is a side plan view of an embodiment of the carrying bag of the present invention shown ready to be grasped by a user for use independently from a walker or other handicapped assisting device.

Note that FIG. 5 shows the configuration shown in FIG. 4, however, in the orientation ready to be carried by a user separate and distinct from the walker. This is one of the important aspects of the present invention wherein the carrying bag or purse item can be used hanging from a walker to facilitate use of the walker by a handicapped person with such bag as shown in FIG. 4 or can be used independently from a walker or other handicapped device in the configuration shown in FIG. 5.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A carrying bag assembly, securable with respect to a disability aiding device which includes a structural bar member, which comprises:

A. a carrying bag defining a carrying enclosure means therewithin;

B. a bag handle attached with respect to said carrying bag to facilitate holding thereof, said bag handle including a first handle strap means and a second handle strap means both attached with respect to said carrying bag;

C. a handle retaining means adapted to engage and retain said bag handle therewithin and also being adapted to engage and retain a structural bar member of a disability aiding device therewithin for facilitating detachable securement of the carrying bag assembly with respect thereto, said handle retaining means comprising:

(1) an inner attaching means extending around said bag handle for retaining thereof therewithin, said inner attaching means being operative to extend around both said first handle strap means and said second handle strap means for facilitating detachable securement thereof together, said inner attaching means including an inner wrapping member for wrapping around said first handle strap means and said second handle strap means to facilitate retaining thereof together, said inner attaching means further including:

a. a first inner securement means positionable adjacent said first handle strap means and being engageable therewith;

b. a second inner securement means positionable adjacent said second handle strap means and being engageable therewith to facilitate securement together of said first handle strap means and said second handle strap means by said inner attaching means; and (2) an outer attaching means positioned extending around said inner attaching means and secured thereto and being detachably securable extending around a structural bar of the disability aiding device to facilitate detachable mounting of the carrying bag assembly means with respect thereto.

2. A carrying bag assembly, securable with respect to a disability aiding device which includes a structural bar member, as defined in claim 1 wherein said inner attaching means is integrally formed with respect to said outer attaching means to facilitate retaining of said bag handle and the structural bar member of the disability aiding device therewithin simultaneously.

3. A carrying bag assembly, securable with respect to a disability aiding device which includes a structural bar member, as defined in claim 1 wherein said first inner securement means comprises a first inner hook and loop fastening means attached to said first handle strap means and to said inner wrapping member to facilitate detachable securement therebetween.

4. A carrying bag assembly, securable with respect to a disability aiding device which includes a structural bar member, as defined in claim 1 wherein said second inner securement means comprises a second inner hook and loop fastening means attached to said second handle strap means and said inner wrapping member to facilitate detachable securement therebetween.

5. A carrying bag assembly, securable with respect to a disability aiding device which includes a structural bar member, as defined in claim 1 wherein the disability aiding device is a walking assistance device.

6. A carrying bag assembly, securable with respect to a disability aiding device which includes a structural bar member, as defined in claim 1 wherein grasping of said outer attaching means of said handle retaining means by a user urges further engagement of said inner attaching means and further engagement of said outer attaching means.

7. A carrying bag assembly, securable with respect to a disability aiding device which includes a structural bar member, as defined in claim 1 further comprising a lower attaching means for selectively engaging the carrying bar directly to the disability aiding device at a location spatially disposed from and below the structural bar member thereof.

8. A carrying bag assembly, securable with respect to a disability aiding device which includes a structural bar member, as defined in claim 1 wherein said outer attaching means includes an outer wrapping member positioned wrapping around said inner wrapping member and capable of wrapping around the structural bar member of the disability aiding device to facilitate retaining of the carrying bag assembly with respect thereto and also being capable of wrapping around said inner wrapping member solely to facilitate independent use of the carrying bag assembly independently of the disability aiding device.

9. A carrying bag assembly, securable with respect to a disability aiding device which includes a structural bar member, as defined in claim 8 wherein said outer wrapping member defines a bar retaining channel therewithin responsive to attachment of said outer attaching means around the structural bar of the disability aiding device to facilitate detachable retaining of the carrying bag assembly therewithin.

10. A carrying bag assembly, securable with respect to a disability aiding device which includes a structural bar member, as defined in claim 8 wherein said outer attaching means further includes an outer securement means mounted on said outer wrapping member to facilitate selective retaining thereof in position extending around said structural bar member of a disability aiding device and around said inner wrapping member.

11. A carrying bag assembly, securable with respect to a disability aiding device which includes a structural bar member, as defined in claim 10 wherein said outer securement means comprises an outer hook and loop fastening means attached to said outer wrapping member to facilitate detachable retaining of the structural bar member of a disability aiding device therewithin.

12. A carrying bag assembly, securable with respect to a disability aiding device which includes a structural bar member, as defined in claim 10 wherein said outer wrapping member can be positioned extending around said inner wrapping member without securement of said outer attaching means to facilitate use of the carrying bag assembly without securement thereof with respect to a structural bar of a disability aiding device.

13. A carrying bag assembly, securable with respect to a disability aiding device which includes a structural bar member, as defined in claim 10 wherein said outer attaching means includes a primary attachment configuration and a secondary attachment configuration for allowing usage of said outer wrapping member positioned in two alternative configurations.

14. A carrying bag assembly, securable with respect to a disability aiding device which includes a structural bar member, as defined in claim 13 wherein positioning of said outer attaching means in said primary attachment configuration defines a bar retaining channel therewithin to facilitate receiving and retaining of the structural bar member of the disability aiding device therewithin to facilitate mounting of said carrying bag assembly with respect thereto.

15. A carrying bag assembly, securable with respect to a disability aiding device which includes a structural bar member, as defined in claim 13 wherein positioning of said outer attaching means in said secondary attachment configuration facilitates positioning of said outer wrapping member in abutment engagement directly around said inner wrapping member to allow usage of the carrying bag assembly independently from the structural bar member of the disability aiding device.

16. A carrying bag assembly, securable with respect to a disability aiding device which includes a structural bar member, which comprises:

A. a carrying bag defining a carrying enclosure means therewithin;

B. a bag handle attached with respect to said carrying bag to facilitate holding thereof, said bag handle including a first handle strap means and a second handle strap means both attached with respect to said carrying bag;

C. a handle retaining means adapted to engage and retain said bag handle therewithin and also being adapted to engage and retain a structural bar member of a disability aiding device therewithin for facilitating detachable securement of the carrying bag assembly with respect thereto, said handle retaining means comprising:

(1) an inner attaching means extending around said bag handle for retaining thereof therewithin, said inner attaching means being operative to extend around both said first handle strap means and said second handle strap means for facilitating detachable securement thereof together, said inner attaching means including:

(a) an inner wrapping member for wrapping around said first handle strap means and said second handle strap means to facilitate retaining thereof together;

(b) a first inner securement means positionable adjacent said first handle strap means and being engageable therewith;

(c) a second inner securement means positionable adjacent said second handle strap means and being engageable therewith to facilitate securement together of said first handle strap means and said second handle strap means by said inner attaching means;

(2) an outer attaching means positioned extending around said inner attaching means and secured thereto and being detachably securable extending around a structural bar of the disability aiding device to facilitate detachable mounting of said carrying bag assembly means with respect thereto, said inner attaching means being integral with respect to said outer attaching means to facilitate retaining of said bag handle and the structural bar member of the disability aiding device therewithin simultaneously, said outer attaching means including:

(a) an outer wrapping member positioned wrapping around said inner wrapping member and capable of wrapping around the structural bar member of the disability aiding device to facilitate retaining of the carrying bag assembly with respect thereto and also being capable of wrapping around said inner wrapping member solely to facilitate independent use of the carrying bag assembly independently of the disability aiding device, said outer wrapping member defining a bar retaining channel therewithin responsive to attachment of said outer attaching means around the structural bar of the disability aiding device to facilitate detachable retaining of the carrying bag assembly; and (b) an outer securement means mounted on said outer wrapping member to facilitate selective retaining thereof in position extending around said structural bar member of a disability aiding device and around said inner wrapping member.

17. A carrying bag assembly, securable with respect to a disability aiding device which includes a structural bar member, which comprises:

A. a carrying bag defining a carrying enclosure means therewithin;

B. a bag handle attached with respect to said carrying bag to facilitate holding thereof, said bag handle including a first handle strap means and a second handle strap means both attached with respect to said carrying bag;

C. a handle retaining means adapted to engage and retain said bag handle therewithin and also being adapted to engage and retain a structural bar member of a disability aiding device therewithin for facilitating detachable securement of the carrying bag assembly with respect thereto, said handle retaining means comprising:

(1) an inner attaching means extending around said bag handle for retaining thereof therewithin, said inner attaching means being operative to extend around both said first handle strap means and said second handle strap means for facilitating detachable securement thereof together, said inner attaching means including:

(a) an inner wrapping member for wrapping around said first handle strap means and said second handle strap means to facilitate retaining thereof together;

(b) a first inner securement means positionable adjacent said first handle strap means and being engageable therewith, said first inner securement means comprising a first inner hook and loop fastening means attached to said first handle strap means and to said inner wrapping member to facilitate detachable securement therebetween;

(c) a second inner securement means positionable adjacent said second handle strap means and being engageable therewith to facilitate securement together of said first handle strap means and said second handle strap means by said inner attaching means, said second inner securement means comprising a second inner hook and loop fastening means attached to said second handle strap means and said inner wrapping member to facilitate detachable securement therebetween;

(2) an outer attaching means positioned extending around said inner attaching means and secured thereto and being detachably securable extending around a structural bar of the disability aiding device to facilitate detachable mounting of said carrying bag assembly means with respect thereto, said inner attaching means being integral with respect to said outer attaching means to facilitate retaining of said bag handle and the structural bar member of the disability aiding device therewithin simultaneously, said outer attaching means including:

(a) an outer wrapping member positioned wrapping around said inner wrapping member and capable of wrapping around the structural bar member of the disability aiding device to facilitate retaining of the carrying bag assembly with respect thereto and also being capable of wrapping around said inner wrapping member solely to facilitate independent use of the carrying bag assembly independently of the disability aiding device, said outer wrapping member defining a bar retaining channel therewithin responsive to attachment of said outer attaching means around the structural bar of the disability aiding device to facilitate detachable retaining of the carrying bag assembly; and (b) an outer securement means mounted on said outer wrapping member to facilitate selective retaining thereof in position extending around said structural bar member of a disability aiding device and around said inner wrapping member, said outer securement means comprising an outer hook and loop fastening means attached to said outer wrapping member to facilitate detachable retaining of the structural bar member of a disability aiding device therewithin, said outer securement means including a primary attachment configuration and a secondary attachment configuration for allowing usage of said outer wrapping member positioned in two alternative configurations wherein positioning of said outer securement means of said outer attaching means in said primary attachment configuration defines a bar retaining channel therewithin to facilitate receiving and retaining of the structural bar member of the disability aiding device therewithin to facilitate mounting of said carrying bag assembly with respect thereto and wherein positioning of said outer securement means in said secondary attachment configuration facilitates positioning of said outer wrapping member in abutment engagement directly around said inner wrapping member to allow usage of the carrying bag assembly independently from the structural bar member of the disability aiding device.

* * * * *